Reissued Sept. 6, 1938

Re. 20,844

UNITED STATES PATENT OFFICE 20,844

DIATOMACEOUS EARTH PRODUCT AND PROCESS OF MAKING THE SAME

Robert Calvert, Scarsdale, N. Y., and Karl L. Dern, Burlingame, and Gordon A. Alles, Los Angeles, Calif., assignors, by mesne assignments, to Celite Corporation, New York, N. Y., a corporation of New York No Drawing. Original No. 1,502,547, dated July 22, 1924, Serial No. 599,434, November 6, 1922. Application for reissue May 18, 1938, Serial No. 208,620

5 Claims. (Cl. 252—2)

This invention relates to the treatment of diatomaceous earth, otherwise known as infusorial earth or kieselguhr, for the purpose of improving its quality, rendering it more effective for various purposes and particularly for use as a filter-aid in the clarification and filtration of liquors, such as solutions of raw sugar in water.

It has been found that by mixing diatomaceous earth under the conditions hereinafter described with a small proportion of any of several different chemicals, particularly sodium chloride and heating the mixture to a suitable temperature and for a suitable period, a substantially new product is formed, such product being in general substantially white in color. When the material so prepared is used as a filter-aid or filtering agent in the clarification or filtration of sugar or other solutions, it has a much greater filtering efficiency or filtering capacity than the original material. The present invention is based on this discovery and its primary object is to provide by treatment of diatomaceous earth in this manner, a product which is of greater commercial value, more attractive appearance and better adapted for use as a filter aid.

Diatomaceous earth calcined in the presence of added salts of alkali forming metals in accordance with the conditions hereinafter described and then re-disintegrated after calcination has been found to be especially effective for use as a filter-aid.

The powdered diatomaceous earth product produced in accordance with our invention will be found to be greatly increased in efficiency and utility when used in the clarification, purification and filtration of animal, marine, vegetable, and mineral oils; solutions of sugars or salts; waste liquids; and any other solutions or mixtures which can be clarified, purified, or filtered by the use of diatomaceous earth.

The process may be carried out as follows: One hundred pounds diatomaceous earth is mixed with five pounds of sodium chloride (common salt) and the mixture is then reduced to a state of fine powder or fine division and to give an intimate mixture. The mixture is then charged into a muffle furnace and heated to about 1800° F., at which temperature it is maintained for one hour. The product is then removed from the furnace, and reduced to form of powder, if necessary, although in some cases such reduction is not required.

The product so obtained has been tested for efficiency as a filter aid or filtration accelerator, in the following manner: Sixty pounds raw cane sugar is dissolved in forty pounds water at 80 degrees C., and to the solution is added 0.8 pounds of the calcined product produced as above described. On pumping through a filter-press with a surface area of .37 square feet, there is obtained in 12 minutes a filtrate weighing 35 pounds as compared with only 6.4 pounds when diatomaceous earth without this treatment is used.

From the foregoing example it is apparent that the powdered filter-aid resulting from the process is capable of producing a rate of flow of about five and one-half times that of the starting material in the process. Calcination of the natural powdered diatomaceous earth in the absence of sodium chloride or equivalent material, as described in Thatcher U. S. Patent 1,477,394 is capable of producing a filter aid under optimum conditions of calcination exhibiting an increase in flow rate of only about two and one-half times the uncalcined natural powder. Accordingly, the powdered filter-aid product of this process may be characterized as a filter-aid having a flow rate compared to the natural uncalcined powder as a standard very substantially greater than can be obtained by a similar calcination treatment in the absence of added sodium chloride or equivalent material. For example, the filter-aid produced by this process may be characterized as having a flow rate at least about four times the flow rate of the natural powder employed as the starting material. In order to distinguish the enhancement in flow rate attributable to calcination alone and that due to calcination under the specified conditions in the presence of a flux, the expression "substantial increase in the flow rate of the finely divided product" as employed in the appended claims is to be understood as specifying a finely divided filter aid product having a marked and substantial increase in flow rate compared to the flow rate of a filter aid product produced by calcining the diatomaceous earth in finely divided condition under optimum calcining conditions but in the absence of an added flux.

While it is not attempted to define the exact nature of the change that is effected in the diatomaceous earth by the stated operation, it may be stated that one advantageous effect of the addition of sodium chloride is presumably that it lowers the sintering point of the diatomaceous earth and particularly of the clay content thereof, so as to enable the finer particles of the material (siliceous dust) to be sintered together or to the larger particles, thereby doing away with the excessively fine particles that might tend to clog the filters. For this reason the temperature of calcination may be defined as that which is sufficiently high to produce incipient fusion, such incipient fusion being defined as a condition at which the particles under the action of heat begin to show a noticeable tendency to adhere, to form weak lumps, or aggregates. The effect of such incipient fusion in the finely divided mixture is further evidenced by the substantial increase in the filtration efficiency of the calcined finely divided product, i. e., the product shows a markedly decreased resistance to the flow therethrough of any of the various liquids such as, for instance, a 60 per cent solution of sugar in water. Presumably, also, the sodium chloride, at temperatures above its melting point, at which temperatures it has sufficient vapor pressure to diffuse throughout the porous mass of diatomaceous earth, reacts with the silica of the diatomaceous earth in the presence of moisture to produce sodium silicate and hydrochloric acid. The resulting product is comparatively free from acid soluble iron, and is correspondingly lighter in color and better adapted to many purposes where the presence of iron is detrimental. The sodium silicate, produced as stated, or the sodium chloride itself, acts as a flux for the finer particles, since in such cases, as stated in "Applied Colloid Chemistry" (W. D. Bancroft, 1921, page 152) the finest particles will have a lower temperature of fusion and will fuse first. Thus the selective fusion of the finest powder in the diatomaceous earth and of the clay present, removes or changes, in such a way so as to render less objectionable, these materials which in ordinary use of diatomaceous earth as a filtration accelerator, tend to retard the action of the accelerator. Other changes may also presumably occur and use is made of all such changes or effects of the heating of diatomaceous earth with sodium chloride. Various other metallic salts or compounds may be used in place of the sodium chloride, for example, calcium chloride, magnesium chloride, or any chloride or halide of any alkali forming metals, that is to say, an alkali metal or alkaline earth metal, or other salts, such as borax, or sodium nitrate, or alkalies, or other fluxing agents.

In the above stated operation, the amount of sodium chloride used may be so regulated that only a trace of same remains in the finished product. Salt of almost any degree of purity may be used, and a smaller or larger proportion of salt may be used than the five per cent mentioned above. The temperature used may be lower or higher than above specified, but lower temperatures give a product of less desirable properties and higher temperatures are more costly to maintain and are liable to result in fusion of the larger particles to form a slag or cause a sintering of the mass.

Any suitable apparatus may be used for carrying out the process, for example, a rotary kiln may be used in place of the muffle furnace. The diatomaceous earth and sodium chloride may be interground, as stated, or they may be separately ground and then mixed, or a part of same may be interground and then mixed with powdered diatomaceous earth. Or the sodium chloride, or other salt or chemical used, may be dissolved in water and the diatomaceous earth wetted with the solution and then ground, either with or without predrying. In all cases as indicated in the foregoing, the mixture subject to calcination is in a powdered or finely divided condition.

As an example of these variations the following method, although varying from the preferred method described above, has been very successfully used in commercially producing this product. An oil fired rotary kiln 6 ft. in diameter and 100 ft. long was continuously fed with the diatomaceous earth which had been milled or powdered, but not completely dried, as is customary, so that almost 20 per cent moisture was present. A technical grade of sodium chloride was fed into the feeding mechanism at about 5 per cent on a total weight of diatomaceous earth.

The temperature of the kiln varied from about 1900° F. in the firing and discharge zone to about 1000° F. at the feed end. The calcined material was cooled and then milled or repowdered by passing through a fan so as to break up the larger particles formed during burning, thereby reducing the calcined product comprising loosely agglomerated large particles or lumps to the state of fine division required for use as a filter-aid. Under certain conditions it may be desirable to incorporate salts of alkali forming metals in the form of a solution and then calcining, and we have found that the operation may be quickly and successfully carried out in this manner.

What we claim is:

1. The process for the production of an improved diatomaceous earth filter-aid characterized by its relatively high flow-rate which consists in forming an intimate powdered mixture of diatomaceous earth in finely divided form with a relatively small amount of an alkali-metal fluxing compound adapted to lower the sintering temperature of the diatomaceous earth and of the clay present, said flux being added in amount sufficient to produce a substantial increase in the flow-rate of the finely divided product under the subsequent calcining treatment, calcining the mixture in loose uncompacted condition for a time and at a temperature not in excess of about 1900° F. and insufficient to sinter the mass but sufficient to produce incipient fusion, said incipient fusion being the condition at which the particles of the powdered mixture under the action of heat begin to show a noticeable tendency to adhere to form weak lumps and a calcined product is produced exhibiting after reduction to a state of fine division a markedly increased flow rate, and reducing the calcined product to a state of fine division.

2. A calcined finely divided diatomaceous earth product adapted for use as a filter-aid and characterized by a flow-rate at least about four-fold that of the diatomaceous earth in finely divided condition prior to calcination, said product consisting of the product resulting from calcining a powdered, uncompacted intimate mixture of diatomaceous earth in finely divided condition with a relatively small amount of a salt of an alkali-metal, such calcination being effected for a time and at a temperature above the melting point of such salt and sufficient to produce incipient fusion in the mixture but insufficient to sinter the mass, said incipient fusion being the condition wherein the particles of the mixture show a noticeable tendency to adhere to form weak lumps, said product containing a small quantity of an alkali-metal silicate formed by the interaction during calcination of said salt and the diatomaceous earth.

3. The process for the production of an improved diatomaceous earth filter-aid characterized by its relatively high flow-rate which consists in forming an intimate powdered mixture of diatomaceous earth in finely divided form with a relatively small amount of a fluxing agent adapted to lower the sintering temperature thereof, said flux being added in amount sufficient to produce a substantial increase in the flow-rate of the finely divided product under the subsequent calcining treatment, calcining the mixture in uncompacted condition for a time and at a temperature insufficient to sinter the mass but sufficient to produce incipient fusion, said incipient fusion being the condition at which the particles of the powdered mixture under the action of heat begin to show a noticeable tendency to adhere to form weak lumps and a calcined product is produced exhibiting after reduction to a state of fine division a markedly increased flow-rate, and reducing the calcined product to a state of fine division.

4. The process of producing a powdered diatomaceous earth filter-aid characterized by its relatively high flow-rate which consists in forming an intimate powdered mixture of diatomaceous earth in finely divided form with a relatively small amount of a fluxing agent adapted to lower the sintering point thereof, calcining the powdered mixture for a time and at a temperature sufficient to sinter the siliceous dust in the mixture and produce loosely agglomerated lumps, but not sufficient to sinter the mass, said fluxing agent being added in amount sufficient to produce under said calcining conditions a flow-rate in the finely divided product at least about four-fold that of the uncalcined finely divided diatomaceous earth, and reducing the loosely agglomerated product resulting from the calcination to a state of fine division.

5. The process of producing a powdered diatomaceous earth filter-aid characterized by its relatively high flow-rate which consists in forming an intimate powdered mixture of diatomaceous earth in finely divided form with a relatively small amount of an alkali-metal fluxing compound adapted to lower the sintering point thereof, calcining the powdered mixture for a time and at a temperature sufficient to sinter the siliceous dust in the mixture and produce loosely agglomerated lumps, but not sufficient to sinter the mass, said fluxing agent being added in amount sufficient to produce under said calcining conditions a flow-rate in the finely divided product at least about four-fold that of the uncalcined finely divided diatomaceous earth, and reducing the loosely agglomerated product resulting from the calcination to a state of fine division.

ROBERT CALVERT.
KARL L. DERN.
GORDON A. ALLES.